(12) United States Patent
Nam et al.

(10) Patent No.: US 9,929,838 B2
(45) Date of Patent: Mar. 27, 2018

(54) METHOD AND SYSTEM FOR MAPPING PILOT SIGNALS IN MULTI-STREAM TRANSMISSIONS

(71) Applicant: Samsung Electronics Co., Ltd., Suwon-si, Gyeonggi-do (KR)

(72) Inventors: Young-Han Nam, Plano, TX (US); Jianzhong Zhang, Plano, TX (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 18 days.

(21) Appl. No.: 14/571,162

(22) Filed: Dec. 15, 2014

(65) Prior Publication Data

US 2015/0098435 A1 Apr. 9, 2015

Related U.S. Application Data

(63) Continuation of application No. 12/709,399, filed on Feb. 19, 2010.

(Continued)

(51) Int. Cl.
*H04W 4/00* (2009.01)
*H04L 5/00* (2006.01)
(Continued)

(52) U.S. Cl.
CPC .......... *H04L 5/0048* (2013.01); *H04L 5/0007* (2013.01); *H04L 5/0026* (2013.01);
(Continued)

(58) Field of Classification Search
CPC ... H04L 5/0048; H04L 5/0026; H04L 5/0028; H04L 5/0023; H04L 5/0016; H04L 5/0083; H04L 27/2601
(Continued)

(56) References Cited

U.S. PATENT DOCUMENTS 8,213,943 B2 7/2012 Malladi et al.
2005/0243939 A1* 11/2005 Jung ..................... H04L 5/0023
375/260

(Continued)

FOREIGN PATENT DOCUMENTS

CN 101189816 A 5/2008
CN 101340227 A 1/2009
(Continued)

OTHER PUBLICATIONS

European Search Report dated Jun. 25, 2015, in connection with European Patent Application No. 15165110.6, 7 pages.
(Continued)

*Primary Examiner* — Thai Hoang (57) ABSTRACT

A base station is provided. The base station comprises a downlink transmit path comprising circuitry configured to transmit a plurality of reference signals in two or more subframes. Each subframe comprises one or more resource blocks. Each resource block comprises S OFDM symbols. Each of the S OFDM symbols comprises N subcarriers, and each subcarrier of each OFDM symbol comprises a resource element. The base station further comprises a reference signal allocator configured to allocate a first group of the plurality of reference signals to selected resource elements of a first subframe according to a reference signal pattern. The first group of the plurality of reference signals is for a first group of antenna ports. The reference signal allocator also configured to allocate a second group of the plurality of reference signals to selected resource elements of a second subframe according to the same reference signal pattern. The second group of the plurality of reference signals is for a second group of antenna ports different from the first group of antenna ports.

12 Claims, 11 Drawing Sheets

| NUMBER OF STREAMS | DM RS REs (A₁, A₂, A₃, A₄) | DM RS REs (B₁, B₂, B₃, B₄) |
|---|---|---|
| 5 | RS FOR STREAM 0 WITH W0<br>RS FOR STREAM 1 WITH W1 | RS FOR STREAM 2 WITH W0<br>RS FOR STREAM 3 WITH W1<br>RS FOR STREAM 4 WITH W2 |
| 6 | RS FOR STREAM 0 WITH W0<br>RS FOR STREAM 1 WITH W1<br>RS FOR STREAM 2 WITH W2 | RS FOR STREAM 3 WITH W0<br>RS FOR STREAM 4 WITH W1<br>RS FOR STREAM 5 WITH W2 |
| 7 | RS FOR STREAM 0 WITH W0<br>RS FOR STREAM 1 WITH W1<br>RS FOR STREAM 2 WITH W2 | RS FOR STREAM 3 WITH W0<br>RS FOR STREAM 4 WITH W1<br>RS FOR STREAM 5 WITH W2<br>RS FOR STREAM 6 WITH W3 |
| 8 | RS FOR STREAM 0 WITH W0<br>RS FOR STREAM 1 WITH W1<br>RS FOR STREAM 2 WITH W2<br>RS FOR STREAM 3 WITH W3 | RS FOR STREAM 4 WITH W0<br>RS FOR STREAM 5 WITH W1<br>RS FOR STREAM 6 WITH W2<br>RS FOR STREAM 7 WITH W3 |

1100

Related U.S. Application Data (60) Provisional application No. 61/210,290, filed on Mar. 17, 2009.

(51) Int. Cl.
*H04L 27/26* (2006.01)
*H04W 72/12* (2009.01)

(52) U.S. Cl.
CPC ........ *H04L 5/0028* (2013.01); *H04L 27/2601* (2013.01); *H04W 72/1289* (2013.01); *H04L 5/0016* (2013.01); *H04L 5/0023* (2013.01); *H04L 5/0083* (2013.01)

(58) Field of Classification Search
USPC ........ 370/312, 328–330, 338–339, 342–345; 375/146, 220, 260–267, 296–308
See application file for complete search history.

(56) References Cited

U.S. PATENT DOCUMENTS

| | | | |
|---|---|---|---|
| 2006/0233274 A1* | 10/2006 | Le Nir | H04L 1/0668 375/267 |
| 2007/0037519 A1 | 2/2007 | Kim et al. | |
| 2007/0058595 A1 | 3/2007 | Classon et al. | |
| 2007/0070944 A1 | 3/2007 | Rinne et al. | |
| 2008/0266176 A1 | 10/2008 | Nabar et al. | |
| 2008/0273452 A1 | 11/2008 | Khan et al. | |
| 2009/0011767 A1 | 1/2009 | Malladi et al. | |
| 2009/0067534 A1 | 3/2009 | Kwak et al. | |
| 2009/0201849 A1* | 8/2009 | Sawahashi | H04B 7/0669 370/328 |
| 2009/0203376 A1 | 8/2009 | Sambhwani et al. | |
| 2009/0249027 A1 | 10/2009 | Kim et al. | |
| 2010/0034077 A1 | 2/2010 | Ishii et al. | |
| 2010/0111065 A1* | 5/2010 | Noh | H04B 7/0434 370/342 |
| 2010/0135242 A1* | 6/2010 | Nam | H04L 5/0007 370/330 |
| 2010/0172311 A1 | 7/2010 | Agrawai et al. | |
| 2011/0085536 A1 | 4/2011 | Taoka et al. | |
| 2011/0194523 A1* | 8/2011 | Chung | H04L 5/0053 370/329 |
| 2011/0211544 A1 | 9/2011 | Sawahashi et al. | |
| 2011/0228718 A1* | 9/2011 | Noh | H04L 5/0051 370/312 |
| 2011/0237270 A1 | 9/2011 | Noh et al. | |
| 2011/0243023 A1 | 10/2011 | Taoka et al. | |
| 2012/0106501 A1 | 5/2012 | Kishiyama et al. | |

FOREIGN PATENT DOCUMENTS

| | | |
|---|---|---|
| JP | 2006287756 A | 10/2006 |
| JP | 2010109714 A | 5/2010 |
| JP | 2010219817 A | 9/2010 |
| JP | 2012503396 A | 2/2012 |
| JP | 2012510772 A | 5/2012 |
| JP | 2012514933 A | 6/2012 |
| RU | 2297731 C2 | 4/2007 |
| WO | WO 2006-098993 A1 | 9/2006 |
| WO | WO 2008-105267 A1 | 9/2008 |
| WO | WO 2009-139383 A1 | 11/2009 |
| WO | WO 2010-032109 A1 | 3/2010 |
| WO | WO 2010-067625 A1 | 6/2010 |

OTHER PUBLICATIONS

3GPP TSG-RAN1 #56; Fujitsu; "DL Reference Signal Design for 8×8 MIMO in LTE-Advanced"; R1-090706; Feb. 9-13, 2009; Athens, Greece; 12 pages.
3GPP TSG RAN WG1 Meeting #55bis; LG Electronics; "Downlink Reference Signal for Higher Order MIMO"; R1-090218; Jan. 12-17, 2009; Ljubljana, Slovenia; 7 pages.
3GPP TSG RAN WG1 meeting #56bis; CATT; "UE-specific RS design for LTE-A"; R1-091517; Mar. 23-27, 2009; Seoul, Korea; 8 pages.
3GPP TSG-RAN Working Group 1 Meeting #56; NORTEL; "Performance evaluation of multiple stream DRS design"; R1-091385; Mar. 23-27, 2009; Seoul, Korea; 5 pages.
Notice of Reason for Rejection in connection with Japanese Patent Application No. 2014-142420, dated Aug. 4, 2015, 10 pages.
International Search Report dated Sep. 28, 2010, in connection with International Patent Application No. PCT/KR2010/001603.
Translation of Japanese Office Action dated Jan. 29, 2013, in connection with Japanese Application No. 2012-500710, 8 pages.
Translation of Russian Office Action dated Dec. 14, 2012, in connection with Russian Application No. 2011141770/07, 13 pages.
Sharp, "Backward Compatible Design of Downlink Reference Signals in LTE-Advanced", 3GPP TSG RAN WG1 Meeting #55bis; Jan. 12-16, 2009; R1090023.7, 7 pages.
NTT Docomo, "Support of DL Higher-Order MIMO Transmission in LTE-Advanced", 3GPP TSG RAN WG1 Meeting #55bis; Jan. 12-16, 2009; R1-090317; 10 pages.
Samsung, "DL RS Designs for Higher Order MIMO", 3GPP TSG RAN WG1 #56; Feb. 9-13, 2009; R1-090619; 8 pages.
Translated Examination dated Aug. 30, 2013, in connection with Chinese Patent Application No. 2010800168286; 13 pages.
Decision on Grant of Russian Patent Application dated Oct. 8, 2013, in connection with Russian Patent Application No. 2011141770/07; 17 pages.
Translated Office Action dated Nov. 18, 2013, in connection with Japanese Patent Application No. 2012-500710; 5 pages.
Extended European Search Report dated Jan. 3, 2014, in connection with European Patent Application No. 110753666.6; 13 pages.
"Considerations on codewords to layers mapping for downlink MIMO", Samsung, 3GPP TSG RAN WG1 Meeting #47bis, Jan. 15-19, 2007, 8 pages, R1-070130.
Office Action dated Jun. 15, 2016 in connection with Korean Patent Application No. 10-2011-7021790.
Extended European Search dated Dec. 19, 2014 in connection with European Patent Application No. 14188076.5, 6 pages.
3GPP TSG RAN WG1 #55bis; "Dual ports DRS design for BF"; R1-090185; Ljubljana, Slovenia; Jan. 12-16, 2009; 7 pages.
3GPP TSG RAN WG1 #56; "DL RS Designs for Higher Order MIMO"; R1-090619; Athens, Greece; Feb. 9-13, 2009; 7 pages.
3GPP TSG RAN WG1 #56; "Further Considerations and Link Simulations on Reference Signals in LTE-A"; R1-090875; Athens, Greece; Feb. 9-13, 2009; 7 pages.
Foreign Communication From a Related Counterpart Application, Japanese Application No. 2014-142420, Text of the Notification of Reason for Rejection, dated Apr. 11, 2017, 8 pages.
3GPP TSG RAN WG1 Meeting #55bis, "CDM-based CRS structure for 8 transmit antennas," Ljubljana, Slovenia, Jan. 12-16, 2009, 7 pages, R1-090272.
Foreign Communication From a Related Counterpart Application, Chinese Application No. 201410563297.2, Text of the First Office Action dated Jan. 16, 2017, 23 pages.

* cited by examiner

| NUMBER OF STREAMS | DM RS REs $(A_1, A_2, A_3, A_4)$ | DM RS REs $(B_1, B_2, B_3, B_4)$ |
|---|---|---|
| 5 | RS FOR STREAM 0 WITH W0<br>RS FOR STREAM 1 WITH W1 | RS FOR STREAM 2 WITH W0<br>RS FOR STREAM 3 WITH W1<br>RS FOR STREAM 4 WITH W2 |
| 6 | RS FOR STREAM 0 WITH W0<br>RS FOR STREAM 1 WITH W1<br>RS FOR STREAM 2 WITH W2 | RS FOR STREAM 3 WITH W0<br>RS FOR STREAM 4 WITH W1<br>RS FOR STREAM 5 WITH W2 |
| 7 | RS FOR STREAM 0 WITH W0<br>RS FOR STREAM 1 WITH W1<br>RS FOR STREAM 2 WITH W2 | RS FOR STREAM 3 WITH W0<br>RS FOR STREAM 4 WITH W1<br>RS FOR STREAM 5 WITH W2<br>RS FOR STREAM 6 WITH W3 |
| 8 | RS FOR STREAM 0 WITH W0<br>RS FOR STREAM 1 WITH W1<br>RS FOR STREAM 2 WITH W2<br>RS FOR STREAM 3 WITH W3 | RS FOR STREAM 4 WITH W0<br>RS FOR STREAM 5 WITH W1<br>RS FOR STREAM 6 WITH W2<br>RS FOR STREAM 7 WITH W3 |

FIG. 12  1200

| NUMBER OF STREAMS | DM RS REs $(A_1, A_2)$ | DM RS REs $(A_3, A_4)$ | DM RS REs $(B_1, B_2)$ | DM RS REs $(B_3, B_4)$ |
|---|---|---|---|---|
| 5 | RS FOR STREAM 0 WITH W0 | RS FOR STREAM 1 WITH W0 | RS FOR STREAM 2 WITH W0 | RS FOR STREAM 3 WITH W0<br>RS FOR STREAM 4 WITH W1 |
| 6 | RS FOR STREAM 0 WITH W0 | RS FOR STREAM 1 WITH W0 | RS FOR STREAM 2 WITH W0<br>RS FOR STREAM 3 WITH W1 | RS FOR STREAM 4 WITH W0<br>RS FOR STREAM 5 WITH W1 |
| 7 | RS FOR STREAM 0 WITH W0 | RS FOR STREAM 1 WITH W0<br>RS FOR STREAM 2 WITH W1 | RS FOR STREAM 3 WITH W0<br>RS FOR STREAM 4 WITH W1 | RS FOR STREAM 5 WITH W0<br>RS FOR STREAM 6 WITH W1 |
| 8 | RS FOR STREAM 0 WITH W0<br>RS FOR STREAM 1 WITH W1 | RS FOR STREAM 2 WITH W0<br>RS FOR STREAM 3 WITH W1 | RS FOR STREAM 4 WITH W0<br>RS FOR STREAM 5 WITH W1 | RS FOR STREAM 6 WITH W0<br>RS FOR STREAM 7 WITH W1 |

| NUMBER OF STREAMS | DM RS REs ($A_1, A_2$) | DM RS REs ($B_1, B_2$) |
|---|---|---|
| 1 | RS FOR STREAM 0 IN $A_1$, DATA IN $A_2$ OR RS FOR STREAM 0 IN ($A_1, A_2$) WITH W0 | RS FOR STREAM 0 IN $B_1$, DATA IN $B_2$ OR RS FOR STREAM 0 IN ($B_1, B_2$) WITH W0 |
| 2 | RS FOR STREAM 0 WITH W0 RS FOR STREAM 1 WITH W1 | RS FOR STREAM 0 WITH W0 RS FOR STREAM 1 WITH W1 |
| 3 | RS FOR STREAM 0 WITH W0 | RS FOR STREAM 1 WITH W0 RS FOR STREAM 2 WITH W1 |
| 4 | RS FOR STREAM 0 WITH W0 | RS FOR STREAM 2 WITH W0 |

METHOD AND SYSTEM FOR MAPPING PILOT SIGNALS IN MULTI-STREAM TRANSMISSIONS

CROSS-REFERENCE TO RELATED APPLICATION(S) AND CLAIM OF PRIORITY

This application is a continuation of U.S. patent application Ser. No. 12/709,399, filed Feb. 19, 2010, entitled "METHOD AND SYSTEM FOR MAPPING PILOT SIGNALS IN MULTI-STREAM TRANSMISSIONS" which claims priority to U.S. Provisional Patent Application No. 61/210,290, filed Mar. 17, 2009, entitled "PILOT MAPPING METHODS FOR MULTI-STREAM TRANSMISSIONS IN OFDM SYSTEMS", which is incorporated herein by reference in the present disclosure as if fully set forth herein.

TECHNICAL FIELD OF THE INVENTION

The present application relates generally to wireless communications and, more specifically, to a method and system for reference signal (RS) pattern design.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station comprises a downlink transmit path comprising circuitry configured to transmit a plurality of reference signals in two or more subframes. Each subframe comprises one or more resource blocks. Each resource block comprises S OFDM symbols. Each of the S OFDM symbols comprises N subcarriers, and each subcarrier of each OFDM symbol comprises a resource element. The base station further comprises a reference signal allocator configured to allocate a first group of the plurality of reference signals to selected resource elements of a first subframe according to a reference signal pattern. The first group of the plurality of reference signals is for a first group of antenna ports. The reference signal allocator also configured to allocate a second group of the plurality of reference signals to selected resource elements of a second subframe according to the same reference signal pattern. The second group of the plurality of reference signals is for a second group of antenna ports different from the first group of antenna ports.

A subscriber station is provided. The subscriber station comprises a downlink receive path comprising circuitry configured to receive a plurality of reference signals in two or more subframes. Each subframe comprises one or more resource blocks. Each resource block comprises S OFDM symbols. Each of the S OFDM symbols comprises N subcarriers, and each subcarrier of each OFDM symbol comprises a resource element. The subscriber station further comprises a reference signal receiver configured to receive a first group of the plurality of reference signals allocated to selected resource elements of a first subframe according to a reference signal pattern. The first group of the plurality of reference signals is for a first group of antenna ports. The reference signal receiver is also configured to receive a second group of the plurality of reference signals allocated to selected resource elements of a second subframe according to the same reference signal pattern. The second group of the plurality of reference signals is for a second group of antenna ports different from the first group of antenna ports.

A base station is provided. The base station comprises a downlink transmit path comprising circuitry configured to transmit a plurality of reference signals in one or more resource blocks. Each resource block comprises S OFDM symbols. Each of the S OFDM symbols comprises N subcarriers, and each subcarrier of each OFDM symbol comprises a resource element. The base station further comprises a reference signal allocator configured to allocate a first group of resource elements for reference signal mapping. The first group of resource elements has a first group of reference signals. Each of the first group of reference signals is assigned for a respective layer selected from a first group of layers. All of the layers assigned to the first group of reference signals are mapped to a first codeword. The reference signal allocator is also configured to allocate a second group of resource elements for reference signal mapping. The second group of resource elements has a second group of reference signals. Each of the second group of reference signals is assigned for a respective layer selected from a second group of layers. All of the layers assigned to the second group of reference signals are mapped to a second codeword, the second codeword being different from the first codeword.

A subscriber station is provided. The subscriber station comprises a downlink receive path comprising circuitry configured to receive a plurality of reference signals in one or more resource blocks. Each resource block comprises S OFDM symbols. Each of the S OFDM symbols comprising N subcarriers, and each subcarrier of each OFDM symbol comprises a resource element. The subscriber station further comprises a reference signal receiver configured to receive a first group of resource elements allocated for reference signal mapping. The first group of resource elements has a first group of reference signals. Each of the first group of reference signals is assigned for a respective layer selected from a first group of layers. All of the layers assigned to the first group of reference signals are mapped to a first codeword. The reference signal receiver is also configured to receive a second group of resource elements allocated for reference signal mapping. The second group of resource elements has a second group of reference signals. Each of the second group of reference signals is assigned for a respective layer selected from a second group of layers. All of the layers assigned to the second group of reference signals are mapped to a second codeword, the second codeword being different from the first codeword.

A base station is provided. The base station comprises a downlink transmit path comprising circuitry configured to transmit a plurality of reference signals in a resource block. The resource block comprises S OFDM symbols. Each of the S OFDM symbols comprises N subcarriers, and each subcarrier of each OFDM symbol comprises a resource element. The base station further comprises a reference signal allocator configured to allocate a number of resource elements of the resource block for transmitting reference signals corresponding to a first antenna port, and to adjust the number of resource elements used for transmitting reference signals corresponding to the first antenna port based at least partly upon a total number of antenna ports in the resource block.

A subscriber station is provided. The subscriber station comprises a downlink receive path comprising circuitry configured to receive a plurality of reference signals in one or more resource blocks. Each resource block comprises S OFDM symbols. Each of the S OFDM symbols comprises N subcarriers, and each subcarrier of each OFDM symbol comprises a resource element. The subscriber station further comprises a reference signal receiver configured to receive a number of resource elements of the resource block allocated for transmitting reference signals corresponding to a first antenna port. The number of resource elements allocated for transmitting reference signals corresponding to the first antenna port is based at least partly upon a total number of antenna ports in the resource block.

A base station is provided. The base station comprises a downlink transmit path comprising circuitry configured to transmit a plurality of reference signals in two or more subframes. Each subframe comprises one or more resource blocks. Each resource block comprises S OFDM symbols. Each of the S OFDM symbols comprises N subcarriers, and each subcarrier of each OFDM symbol comprises a resource element. The base station further comprises a reference signal allocator configured to allocate a plurality of resource elements of the resource block for transmitting reference signals corresponding to one or more antenna ports and to group the plurality of resource elements into one or more groups of resource elements. Each group of resource elements has a same number of resource elements. The reference signals within each of the one or more groups of resource elements are multiplexed using a code division multiplexing (CDM), and the number of resource elements in each of the one or more groups of resource elements is based at least partly upon a rank of the resource block.

A subscriber station is provided. The subscriber station comprises a downlink receive path comprising circuitry configured to receive a plurality of reference signals in one or more resource blocks. Each resource block comprises S OFDM symbols. Each of the S OFDM symbols comprises N subcarriers, and each subcarrier of each OFDM symbol comprises a resource element. The subscriber station further comprises a reference signal receiver configured to receive a plurality of resource elements of the resource block for transmitting reference signals corresponding to one or more antenna ports. The plurality of resource elements are grouped into one or more groups of resource elements with each group of resource elements having a same number of resource elements. The reference signals within each of the one or more groups of resource elements are multiplexed using a code division multiplexing (CDM), and the number of resource elements in each of the one or more groups of resource elements is based at least partly upon a rank of the resource block.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
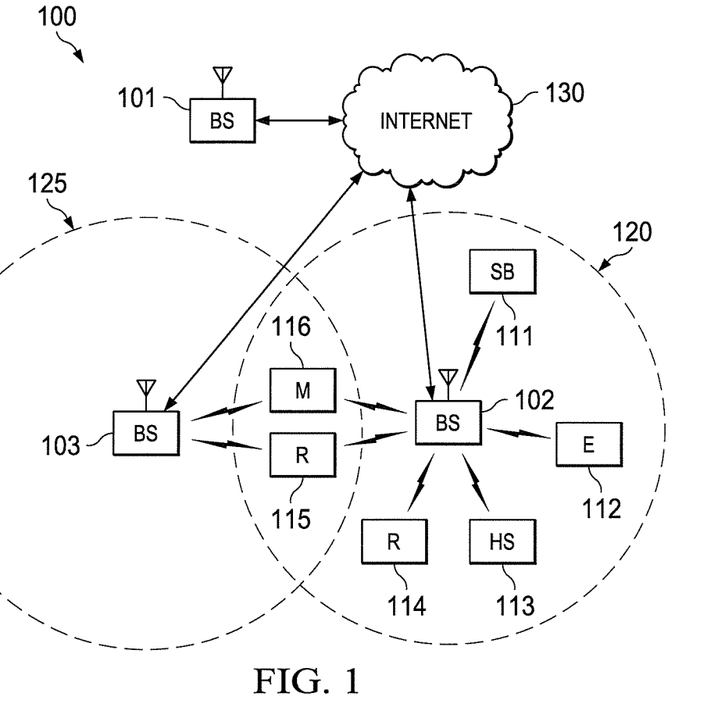
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
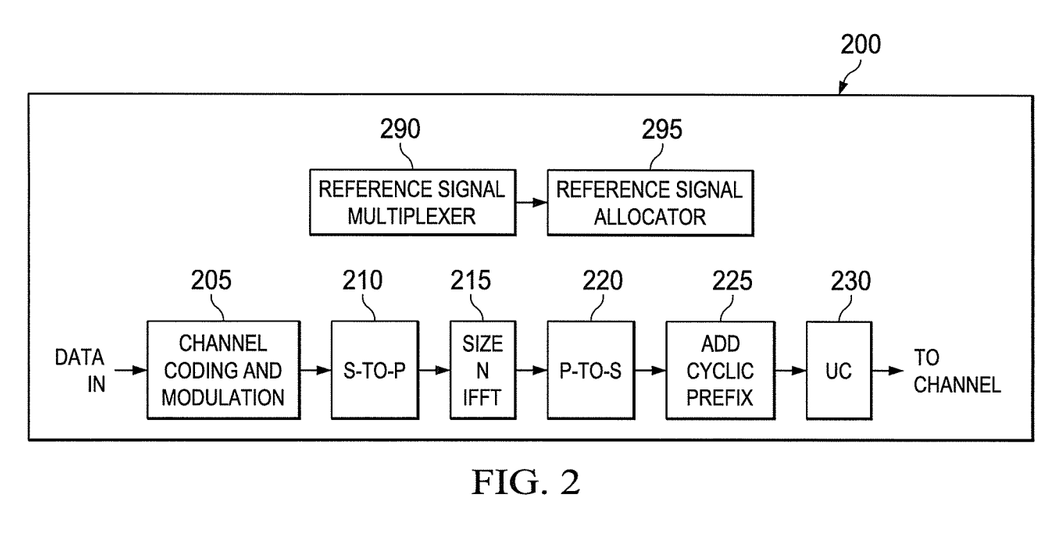
FIG. 2 is a high-level diagram of an OFDMA transmitter according to one embodiment of the disclosure.
Figure 3:
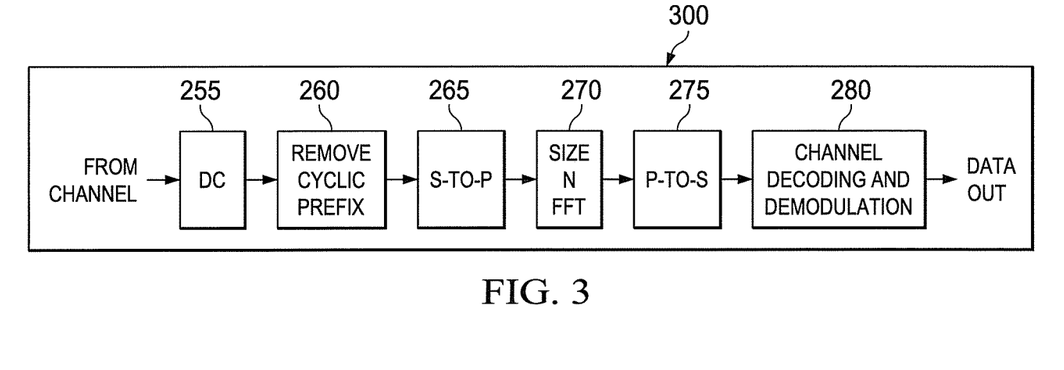
FIG. 3 is a high-level diagram of an OFDMA receiver according to one embodiment of the disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for reference signal (RS) pattern design.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission of Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

In an embodiment of the disclosure, a CQI reference signal (CQI RS) mapping pattern is defined as a set of resource elements (REs) in one resource block (RB) spanning two slots (or one subframe), where the pattern repeats every RB in a subset or in the set of RBs in the system bandwidth.

In particular embodiments, CQI RS REs reside in only one slot or in both slots in an RB in one subframe.

Figure 4:
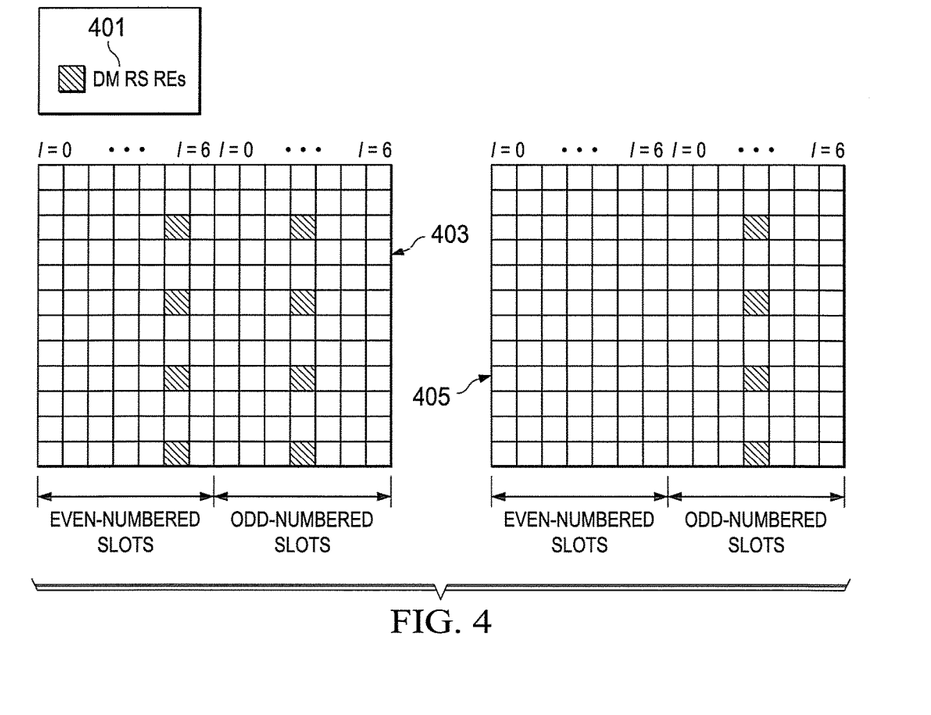
FIG. 4 illustrates channel quality information (CQI) reference signal patterns according to an embodiment of the disclosure.

FIG. 4 illustrates CQI reference signal patterns according to an embodiment of the disclosure.

In FIG. 4, cross-hatched resource elements 401 indicate demodulation (DM) RS REs. Resource block 403 illustrates an example where CQI RS REs reside in both slots in an RB. As shown in resource block 403, a CQI RS pattern appears in OFDM symbol 5 in the even-numbered slots and OFDM symbol 3 in the odd-numbered slots. Of course, one of ordinary skill in the art would recognize that DM RS mapping patterns similar to the pattern shown in resource block 403 can be constructed by choosing different OFDM symbols for the DM RS REs. Resource block 405 illustrates an example where CQI RS REs reside in only one slot in an RB. In resource block 405, the CQI RS pattern has CQI RS REs only in one slot, which is OFDM symbol 3 in the odd-numbered slots.

In an embodiment of this disclosure, a CQI RS mapping pattern is provided for estimating channel state information (CSI) at the receiver side for multiple Tx antenna-port channels, where CSI includes channel quality information (CQI), rank information (RI), and precoding matrix information (PMI), and channel direction information (CDI), and so forth.

Figure 5:
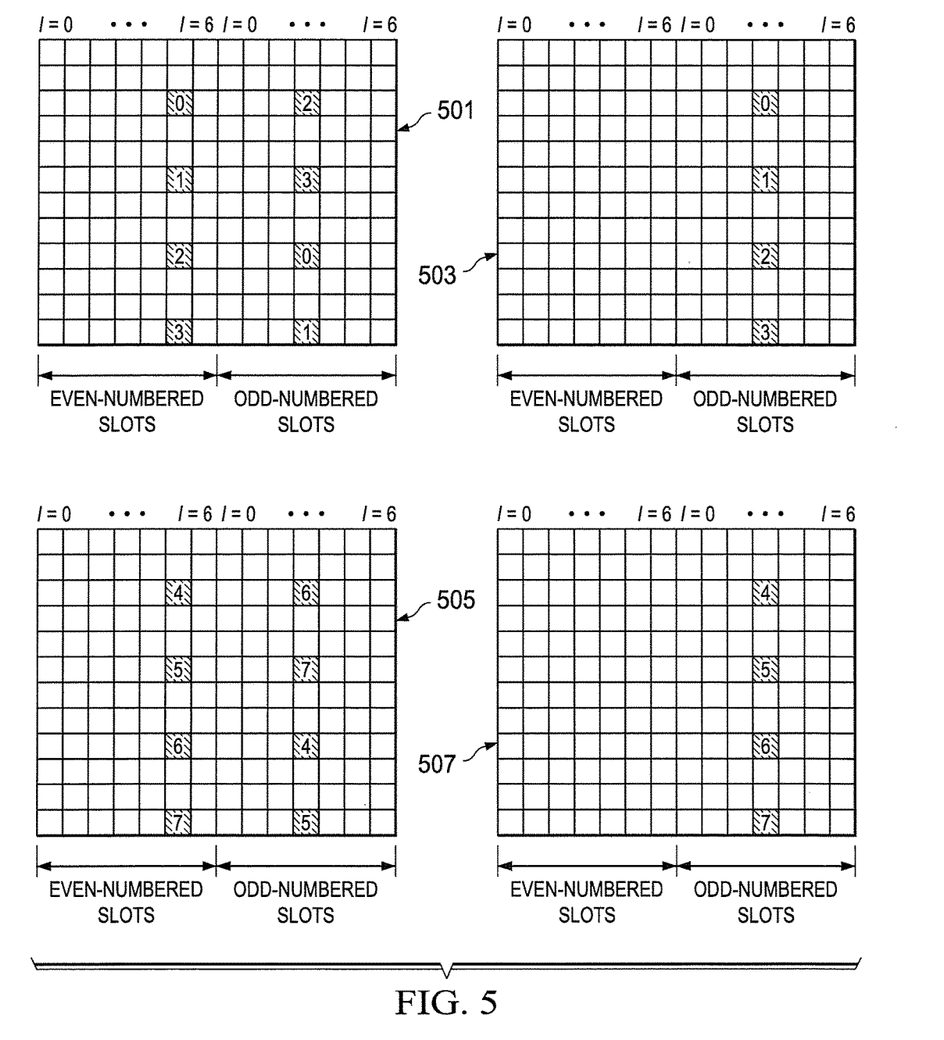
FIG. 5 illustrates CQI reference signal patterns that provide pilot signals for up to 4 transmit antenna-port channels in a resource block according to an embodiment of the disclosure.

FIG. 5 illustrates CQI reference signal patterns that provide pilot signals for up to 4 transmit antenna-port channels in a resource block according to an embodiment of the disclosure.

Each set of CQI RS REs labeled with number i carries the pilot signals for antenna port i, where i=0,1,2,3. In an embodiment of this disclosure, one CQI RS pattern is used for different sets of antenna ports in different subframes. For example, in resource blocks 501 and 503, the CQI RS pattern is used for sending pilots for antenna ports 0, 1, 2 and 3 in some subframes, while in other subframes as shown in resource blocks 505 and 507, the same CQI RS pattern is used for antenna ports 4, 5, 6 and 7, where (4,5,6,7) is mapped to RS REs labeled with (0,1,2,3), respectively.

In an embodiment of this disclosure, the CQI subframes (i.e., the subframes where CQI RSs are transmitted) can be either periodically set (e.g., every 5 subframes) or aperiodically set. The period and offset for the CQI RS subframes can be set by broadcast signaling or by an implicit function of the cell-id and subframe number. In a particular embodiment, the remainder of the division of the cell-id by the period becomes the CQI RS subframe offset. For example, the CQI RS subframe period is set to be 5 subframes by a broadcasted value. In this case, a cell with cell-id 2 has CQI RS in subframes 2 and 7, while a cell with cell-id 3 has CQI RS in subframes in 3 and 8.

Figure 6:
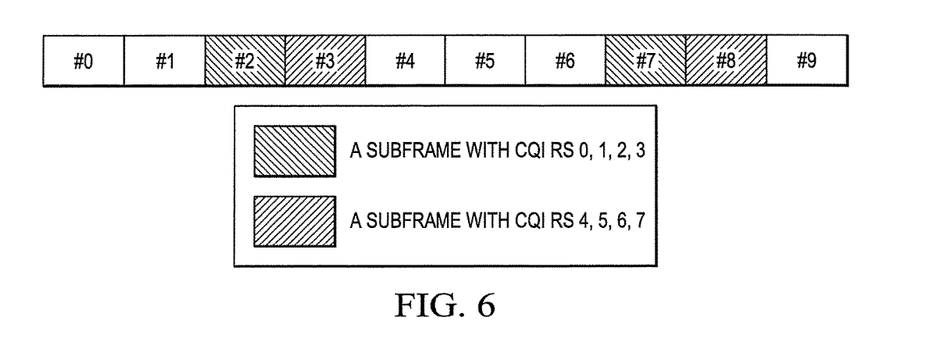
FIG. 6 illustrates alternating sets of antenna ports for which a CQI reference signal pattern provides pilots according to an embodiment of the disclosure.

FIG. 6 illustrates alternating sets of antenna ports for which a CQI reference signal pattern provides pilots according to an embodiment of the disclosure.

In some embodiments, the sets of antenna ports for which a CQI RS pattern provides pilots alternate as the subframes progress in time. For example, in a first CQI RS subframe, pilots for ports 0 and 1 are transmitted; in a second CQI RS subframe, pilots for ports 2 and 3 are transmitted; in a third CQI RS subframe, pilots for ports 4 and 5 are transmitted; in a fourth CQI RS subframe, pilots for ports 6 and 7 are transmitted; in a fifth CQI RS subframe, pilots for ports 0 and 1 are transmitted again, and so forth. In another example shown in FIG. 6, in a first CQI RS subframe (subframe #2), pilots for ports 0, 1, 2 and 3 are transmitted using the CQI RS pattern in resource block 501. In a second such subframe (subframe #3), pilots for ports 4, 5, 6 and 7 are transmitted. In a third such subframe (subframe #7), pilots for ports 0, 1, 2, 3 are transmitted; in a fourth such subframe (subframe #8), pilots for ports 4, 5, 6, 7, are transmitted, and so forth.

In further embodiments, each group of CQI subframes that contains CQI RS REs for a set of antenna ports can be either periodically set (e.g., every 5 subframes) or aperiodically set.

In one embodiment, the periods and offsets for all the groups of CQI RS subframes can be set by broadcast signaling or by an implicit function of the cell-id and subframe number.

In another embodiment, the period and offset for one group (denoted by the first group) of CQI RS subframes can be set by broadcast signaling or by an implicit function of the cell-id and subframe number, while the periods and offsets for the other groups of CQI RS subframes are implicitly indicated by the signaling.

In a particular embodiment, the periods of all the other groups of CQI RS subframes are the same as the first group. The offset of the second group is one greater than that of the first group, and the offset of the third group is two greater than that of the first group, and so on. When the offset value calculated by this method is greater than the period, the subframe offset is re-calculated as the one obtained after subtracting the period from the old offset value.

For example, as shown in FIG. 6, the CQI RS subframe period is set to be 5 subframes by a broadcasted value. In this case, a cell with cell-id 2 has CQI RS in subframes 2 and 7 for sending CQI RS for antenna ports 0, 1, 2 and 3. In addition, according to the example offset rule for the second group, this cell has CQI RS for antenna ports 4, 5, 6 and 7 in subframes 3 and 8.

In other embodiments, when a CQI RS subframe determined by a period and an offset happens to be a primary synchronization signal (PSS) subframe or a secondary synchronization signal (SSS) subframe, the CQI RS in the PSS/SSS subframe may be dropped, transmitted right after the PSS/SSS subframe, or transmitted in a subset of RBs in the PSS/SSS subframe where PSS/SSS related signals are not transmitted.

Figure 7:
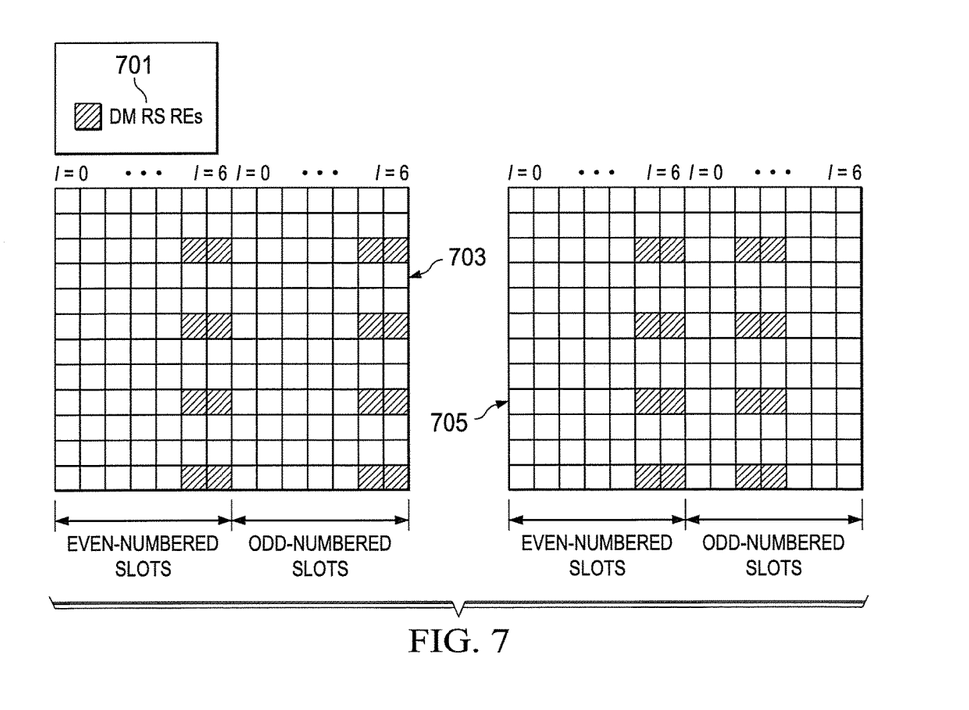
FIG. 7 illustrates user equipment (UE)-specific demodulation reference signal (DM RS) mapping patterns according to an embodiment of the disclosure.

FIG. 7 illustrates UE-specific demodulation reference signal (DM RS) mapping patterns according to an embodiment of the disclosure.

A UE-specific demodulation reference signal (DM RS) mapping pattern refers to a set of resource elements (REs) in one resource block (RB), where the pattern repeats in all the assigned RBs in a transmission. The set of RBs can be assigned for transmission to a single UE or multiple UEs. In FIG. 7, cross-hatched resource elements 701 indicate DM RS REs. In resource block 703, the same DM RS mapping pattern is applied to OFDM symbols 5 and 6 of both slots. Of course, one of ordinary skill in the art would recognize that DM RS mapping patterns similar to the pattern shown in resource block 703 can be constructed by choosing different OFDM symbols for the DM RS REs. In resource block 705, the same DM RS mapping pattern is applied but to different OFDM symbols from resource block 703. In resource block 705, the DM RS mapping pattern is applied to OFDM symbols 2 and 3 in the odd-numbered slots.

Figure 8:
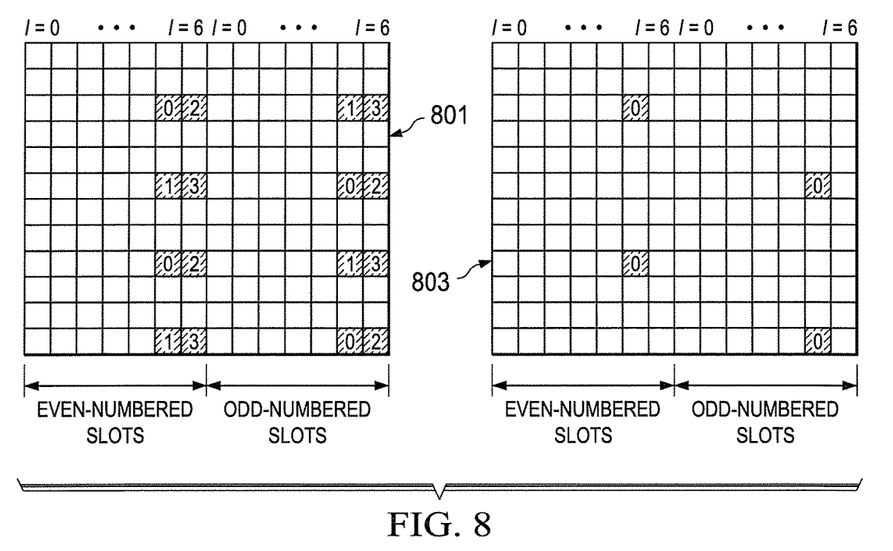
FIG. 8 illustrates DM RS mapping patterns used for downlink transmission, where a subset of the DM RS resource elements provides pilots for multiple streams (or layers) according to an embodiment of the disclosure.

FIG. 8 illustrates DM RS mapping patterns used for downlink transmission, where a subset of the DM RS resource elements provides pilots for multiple streams (or layers) according to an embodiment of the disclosure.

In resource block 801 and 802, each set of DM RS REs labeled with number i carries the pilot signals for stream i, where i=0,1,2,3. As shown, the DM RS pattern in resource block 801 can be used to provide pilot signals for up to 4 multiplexed streams (or layers) in an RB while the DM RS pattern in resource block 803 can be used to provide pilot signals for one stream. In some embodiments, when the number of streams (or layers) is n≤4, DM RS REs labeled with number up to n−1 are used to carry pilot signals, while the others are used to carry data symbols. For example, with transmission rank 1 or when only one stream is transmitted to a UE, only the DM RS REs labeled with 0 carry the pilot signals for the UE, while the other DM RS REs labeled with 1, 2, 3 may carry data symbols.

Figure 9:
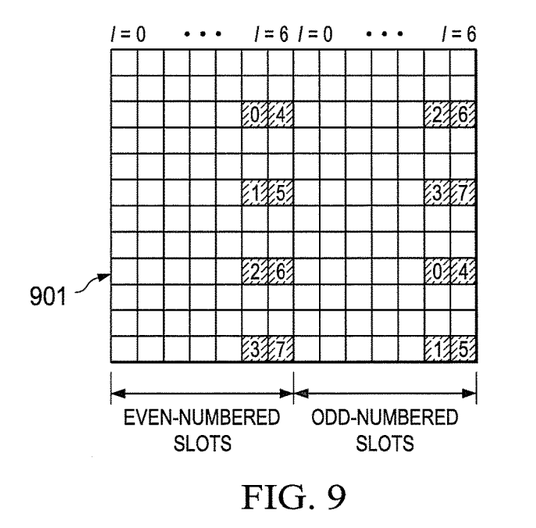
FIG. 9 illustrates a DM RS mapping pattern in which the DM RS density per stream is reduced according to an embodiment of the disclosure.

FIG. 9 illustrates a DM RS mapping pattern in which the DM RS density per stream is reduced according to an embodiment of the disclosure.

In further embodiments of the disclosure, the DM RS mapping pattern is kept the same with different number of transmitted streams (or layers), while the per-stream RS density may decrease or be diluted when the total number of streams (or layers) multiplexed in an RB reaches a certain limit. For example, the DM RS pattern of resource block 801 is used to provide up to 4 pilot signals for each of 4 streams (or layers). For a higher number of total transmitted streams, the DM RS density per stream is reduced as shown in the DM RS pattern of resource block 901. In resource block 901, the number of RS REs per stream is 2 which is half the density of the DM RS pattern of resource block 801.

Of course, one of ordinary skill in the art would recognize that a total number of resource elements allocated for a particular antenna port in a resource block also may be increased or decreased as described above according to a total number of antenna ports in the resource block as the total number of streams or layers also represent the total number of antenna ports in the resource block.

Figure 10:
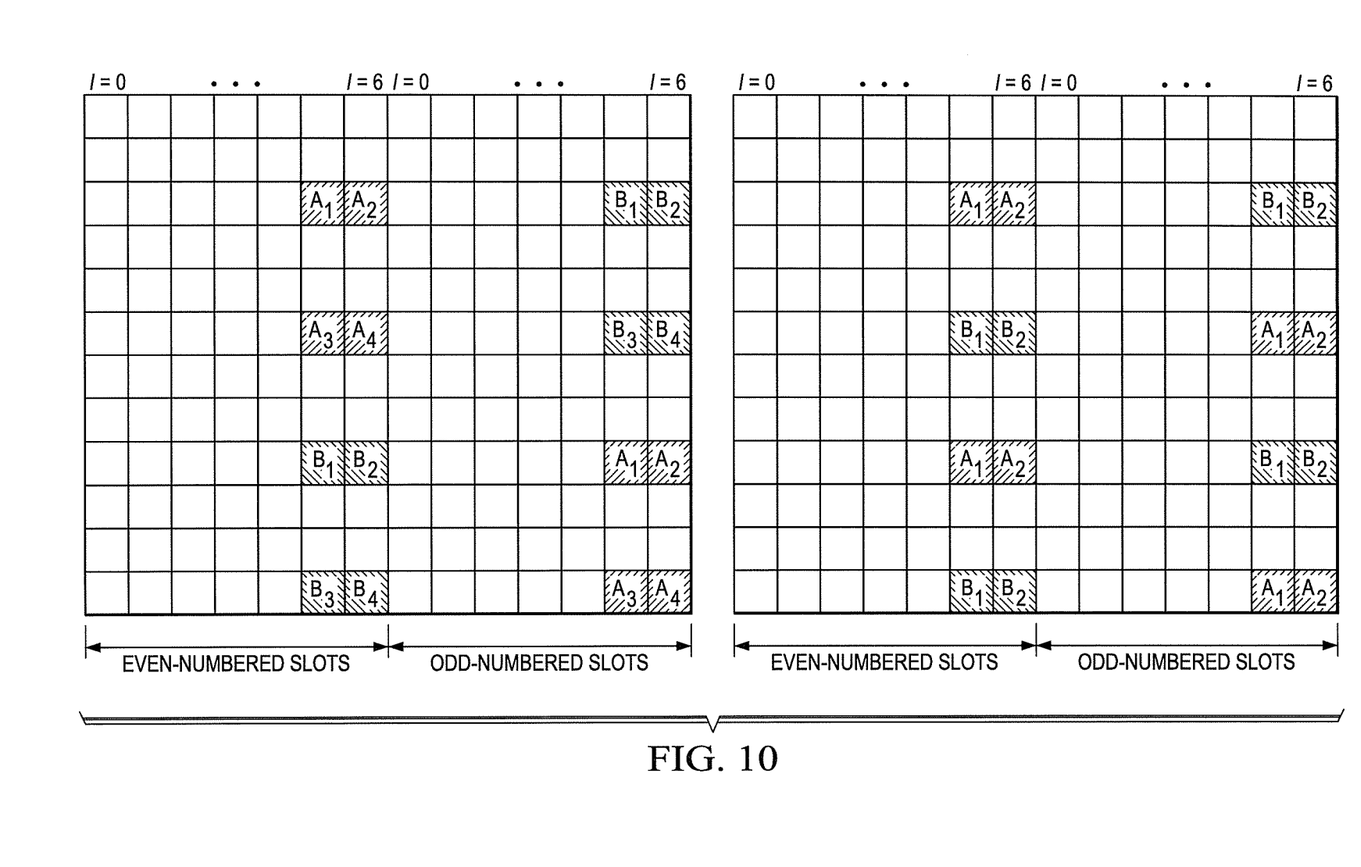
FIG. 10 illustrates DM RS mapping patterns in which code division multiplexing (CDM) is applied to multiplex more pilot signals when the number of streams (or layers) multiplexed in a resource block reaches a certain limit according to an embodiment of the disclosure.

FIG. 10 illustrates DM RS mapping patterns in which code division multiplexing (CDM) is applied to multiplex more pilot signals when the number of streams multiplexed in a resource block reaches a certain limit according to an embodiment of the disclosure.

In another embodiment of the disclosure, the DM RS mapping pattern is kept the same with different number of transmitted streams, while code division multiplexing (CDM) is applied to multiplex more pilot signals when the number of streams multiplexed in an RB reaches a certain limit. In particular, the DM RS REs in a DM RS mapping pattern are partitioned into multiple (e.g., two) groups, where the RS REs in one group has a staggered pattern in the time-frequency grid.

In a particular embodiment, when an even number (2n) of streams are multiplexed in an RB, the streams are partitioned into two groups of the equal number (n) of streams. Then, n Walsh covers are assigned to the n streams within each group. When the DM RS REs in a DM RS mapping pattern also are partitioned into the same number of groups (i.e., two groups), the n pilots for each group of streams are mapped onto each set of DM RS REs with their Walsh covers applied.

When an odd number (2n+1) of streams are multiplexed in an RB, the streams are partitioned into two groups of size n and n+1, where the streams that are to be decoded earlier at the receiver (e.g., successive interference cancellation: SIC receiver) are assigned to the group of smaller size, while the other streams are assigned to the group of larger size. The DM RS REs in a DM RS pattern also are partitioned into two sets. Then, n and n+1 Walsh covers are assigned to the streams in the two groups, respectively, and the pilots for each group of streams are Walsh-covered and mapped onto each set of DM RS REs.

In one example, the DM RS pattern of resource block 801 is used for providing up to 4 pilot signals for each of 4 streams. For higher number of transmitted streams, CDM is applied on each group of four RS REs (i.e., spreading factor=4) as shown in the DM RS pattern of resource block 1001. In this particular example, there are four Walsh covers of length 4: W0=[1 1 1 1], W1=[1 −1 1 −1], W2=[1 −1 −1 1] and W3=[−1 1 1 −1]. One Walsh cover is given for each stream. Then, the transmitter applies each stream's Walsh cover on a pilot symbol of the stream, which gives a length-4 sequence. This length 4 sequence is mapped onto DM RS REs labeled with either $(A_1, A_2, A_3, A_4)$ or $(B_1, B_2, B_3, B_4)$.

Figure 11:
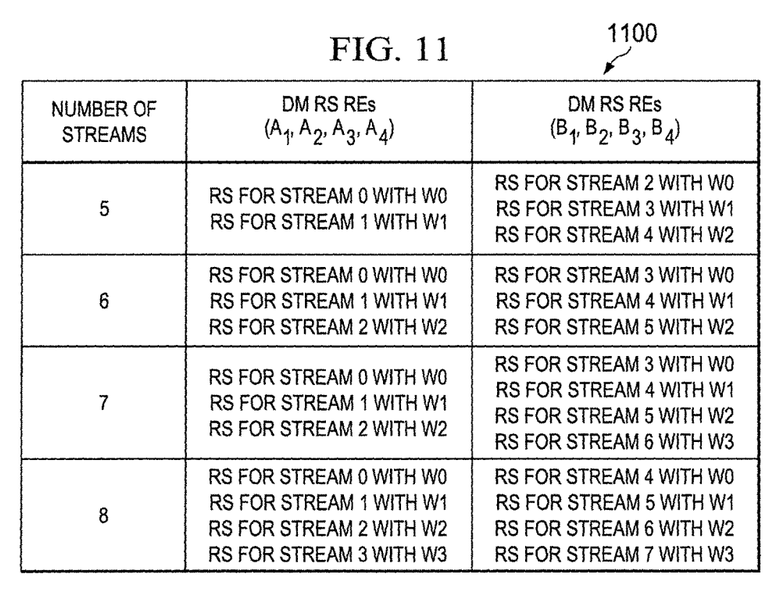
FIG. 11 is a table 1100 showing the mapping of code division multiplexed (CDMed) pilot signals according to an embodiment of the disclosure.

FIG. 11 is a table 1100 showing the mapping of CDMed pilot signals according to an embodiment of the disclosure.

In a specific embodiment, a stream with a smaller index is to be decoded no later than another stream with a larger index at the receiver side. As shown in table 1100, when 5 streams are multiplexed on DM RS REs $(A_2, A_3, A_4)$, antenna port 0 transmits a pilot signal W0=[1 1 1 1] while antenna port 1 transmits a pilot signal W1=[1 −1 1 −1].

Figure 12:
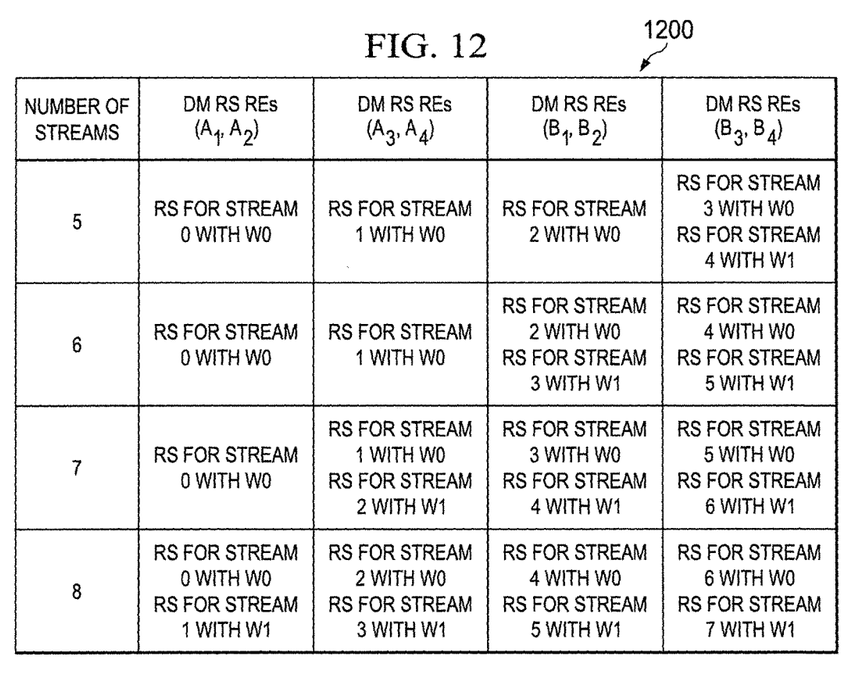
FIG. 12 is a table showing the mapping of CDMed pilot signals according to another embodiment of the disclosure.

FIG. 12 is a table 1200 showing the mapping of CDMed pilot signals according to another embodiment of the disclosure.

In this specific example, table 1200 summarizes the DM RS pattern of resource block 1001 with length-2 Walsh covers (or with spreading factor=2) W0=[1 1] and W1=[1 −1]. As shown in table 1200, when 5 streams are multiplexed on DM RS REs $(A_1, A_2, A_3, A_4)$, antenna ports 0 and 1 transmit a pilot signal W0=[1 1 ].

Figure 13:
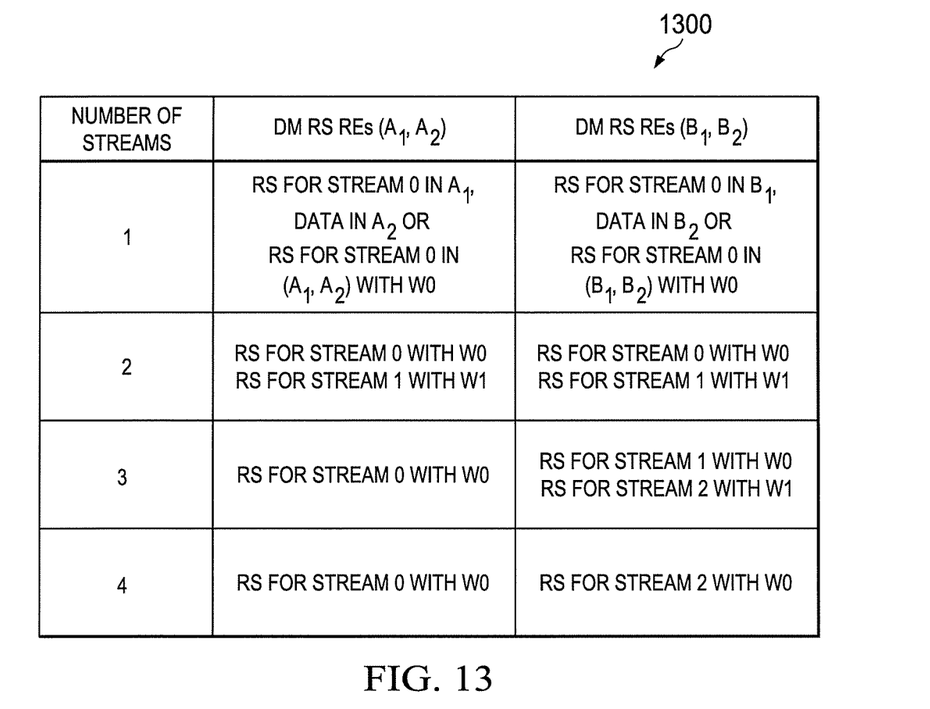
FIG. 13 is a table showing the mapping of CDMed pilot signals according to a further embodiment of the disclosure.

FIG. 13 is a table 1300 showing the mapping of CDMed pilot signals according to a further embodiment of the disclosure.

In this embodiment, CDM is applied on the DM RS pattern when there is a smaller number of streams as well. In a specific example, DM RS REs in a DM RS pattern are partitioned into multiple (e.g., two) groups, where two adjacent DM RS REs in a group are paired for CDM Walsh covering with length-2 Walsh covers. The RS REs in one group have a staggered pattern in the time-frequency grid. For example, the DM RS pattern of resource block 1003 with length-2 Walsh code is used when the number of streams is less than 5. As shown in table 1300, when 4 streams are multiplexed on DM RS REs $(A_1, A_2)$, antenna port 0 transmits a pilot signal W0=[1 1] while antenna port 1 transmits a pilot signal W1=[1 −1].

Figure 14:
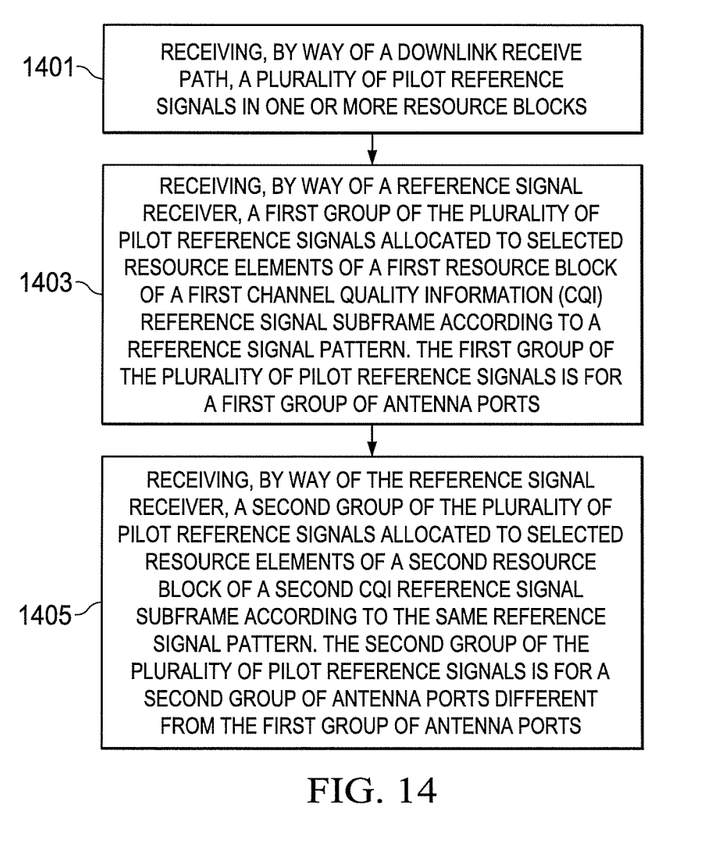
FIG. 14 illustrates a method of operating a subscriber station according to an embodiment of the disclosure.

FIG. 14 illustrates a method of operating a subscriber station according to an embodiment of the disclosure.

Method 1400 includes receiving, by way of a downlink receive path, a plurality of pilot reference signals in one or more resource blocks (Block 1401). Each resource block comprises S OFDM symbols, each of the S OFDM symbols comprises N subcarriers, and each subcarrier of each OFDM symbol comprises a resource element. Method 1400 also includes receiving, by way of a reference signal receiver, a first group of the plurality of pilot reference signals allocated to selected resource elements of a first resource block of a first channel quality information (CQI) reference signal subframe according to a reference signal pattern (Block 1403). The first group of the plurality of pilot reference signals is for a first group of antenna ports. Method 1400 further comprises receiving, by way of the reference signal receiver, a second group of the plurality of pilot reference signals allocated to selected resource elements of a second resource block of a second CQI reference signal subframe according to the same reference signal pattern (Block 1405). The second group of the plurality of pilot reference signals is for a second group of antenna ports different from the first group of antenna ports.

Figure 15:
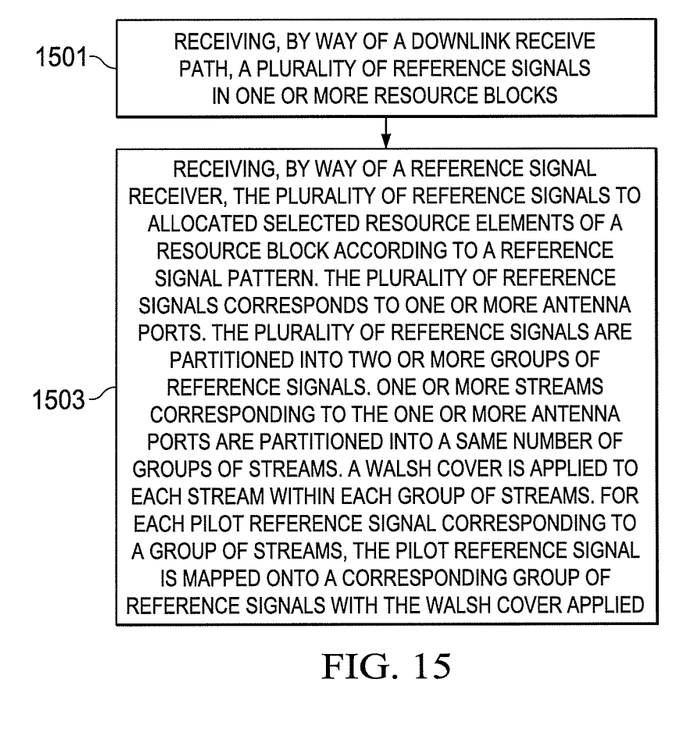
FIG. 15 illustrates another method of operating a subscriber station according to an embodiment of the disclosure.

FIG. 15 illustrates another method of operating a subscriber station according to an embodiment of the disclosure.

Method 1500 includes receiving, by way of a downlink receive path, a plurality of reference signals in one or more resource blocks (Block 1501). Each resource block comprises S OFDM symbols, each of the S OFDM symbols comprises N subcarriers, and each subcarrier of each OFDM symbol comprises a resource element. Method 1500 also includes receiving, by way of a reference signal receiver, the plurality of reference signals to allocated selected resource elements of a resource block according to a reference signal pattern. The plurality of reference signals corresponds to one or more antenna ports. The plurality of reference signals are partitioned into two or more groups of reference signals. One or more streams corresponding to the one or more antenna ports are partitioned into a same number of groups of streams. A Walsh cover is applied to each stream within each group of streams. For each pilot reference signal corresponding to a group of streams, the pilot reference signal is mapped onto a corresponding group of reference signals with the Walsh cover applied (Block 1503).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station for transmitting a reference signal, comprising:
   a downlink transmit path comprising circuitry configured to transmit a plurality of reference signals in one subframe, wherein each subframe comprises two slots and each slot comprises a plurality of orthogonal frequency-division multiplexing (OFDM) symbols, and wherein each of the plurality of OFDM symbols comprises a plurality of resource elements; and
   a reference signal controller configured to apply one orthogonal cover code corresponding to an antenna port to a set of resource elements;
   wherein a total number of antenna ports is based on a number of layers,
   wherein up to two sets of resource elements are available in the one subframe, wherein each of the sets of resource elements includes up to four reference signals, wherein each reference signal is for each antenna port, and wherein each antenna port is associated with the one orthogonal cover code, wherein a length of the one orthogonal cover code is 4 and the one orthogonal cover code is applied to 4 resource elements, wherein, when the number of layers is even, an equal number of antenna ports is allocated to each of the sets of resource elements and, when the number of layers is odd, a second of the sets of resource elements is allocated a greater number of antenna ports than a first of the sets of resource elements.

2. The base station of claim 1, wherein each of the sets of resource elements comprises at least two resource elements in a sixth OFDM symbol and at least two resource elements in a seventh OFDM symbol in the each slot.

3. The base station of claim 1, wherein if the number of layers is greater than four, a fifth antenna port to an eighth antenna port are each associated with the one orthogonal cover code associated respectively with a first antenna port to a fourth antenna port.

4. A subscriber station for receiving a reference signal, comprising:
a downlink receive path comprising circuitry configured to receive a plurality of reference signals in one subframe, wherein each subframe comprises two slots and each slot comprises a plurality of orthogonal frequency-division multiplexing (OFDM) symbols, and wherein each of the plurality of OFDM symbols comprises a plurality of resource elements; and
a reference signal controller configured to identify one orthogonal cover code corresponding to an antenna port applied to a set of resource elements;
wherein a total number of antenna ports is based on a number of layers,
wherein up to two sets of resource elements are available in the one subframe, wherein each of the sets of resource elements includes up to four reference signals, wherein each reference signal is for each antenna port, and wherein each antenna port is associated with one code,
wherein a length of the one orthogonal cover code is 4 and the one orthogonal cover code is applied to 4 resource elements,
wherein, when the number of layers is even, an equal number of antenna ports is allocated to each of the sets of resource elements and, when the number of layers is odd, a second of the sets of resource elements is allocated a greater number of antenna ports than a first of the sets of resource elements.

5. The subscriber station of claim 4, wherein each of the sets of resource elements comprises at least two resource elements in sixth OFDM symbol and at least two resource elements in seventh OFDM symbol in the each slot.

6. The subscriber station of claim 4, wherein if the number of layers is greater than four, a fifth antenna port to an eighth antenna port are each associated with the one orthogonal cover code associated respectively with a first antenna port to a fourth antenna port.

7. A method for transmission of a reference signal, comprising steps of:
applying at least one orthogonal cover code corresponding to at least one antenna port to at least one set of resource elements; and
transmitting a plurality of reference signals in one subframe, wherein each subframe comprises two slots and each slot comprises a plurality of orthogonal frequency-division multiplexing (OFDM) symbols, and wherein each of the plurality of OFDM symbols comprises a plurality of resource elements,
wherein a total number of antenna ports is based on a number of layers,
wherein up to two sets of resource elements are available in the one subframe, wherein each of the sets of resource elements includes up to four reference signals, wherein each reference signal is for each antenna port, and wherein each antenna port is associated with one code,
wherein a length of the one orthogonal cover code is 4 and the one orthogonal cover code is applied to 4 resource elements,
wherein, when the number of layers is even, an equal number of antenna ports is allocated to each of the sets of resource elements and, when the number of layers is odd, a second of the sets of resource elements is allocated a greater number of antenna ports than a first of the sets of resource elements.

8. The method of claim 7, wherein each of the sets of resource elements comprises at least two resource elements in sixth OFDM symbol and at least two resource elements in seventh OFDM symbol in the each slot.

9. The method of claim 7, wherein if the number of layers is greater than four, a fifth antenna port to an eighth antenna port are each associated with the one orthogonal cover code associated respectively with a first antenna port to a fourth antenna port.

10. A method for reception of a reference signal, comprising:
receiving at least one reference signal by applying at least one orthogonal cover code corresponding to at least one antenna port to at least one set of resource elements; and
identifying a plurality of reference signals in one subframe, each subframe comprises two slots, each slot comprises a plurality of orthogonal frequency-division multiplexing (OFDM) symbols, and each of the plurality of OFDM symbols comprises a plurality of resource elements,
wherein a total number of antenna ports is based on a number of layers,
wherein up to two sets of resource elements are available in the one subframe, wherein each set of resource elements includes up to four reference signals, wherein each reference signal is for each antenna port, and wherein each antenna port is associated with one code,
wherein a length of the one code is 4 and the one code is applied to 4 resource elements,
wherein, when the number of layers is even, an equal number of antenna ports is allocated to each of the sets of resource elements and, when the number of layers is odd, second of the sets of resource elements is allocated a greater number of antenna ports than a first of the sets of resource elements.

11. The method of claim 10, wherein each set of resource elements comprises at least two resource elements in sixth OFDM symbol and at least two resource elements in seventh OFDM symbol in the each slot.

12. The method of claim 10, wherein if a number of layers is greater than four, a fifth antenna port to an eighth antenna port are each associated with the one orthogonal cover code associated respectively with a first antenna port to a fourth antenna port.

* * * * *